United States Patent [19]

Shafer et al.

[11] Patent Number: 4,863,253

[45] Date of Patent: Sep. 5, 1989

[54] HIGH MAGNIFICATION REFLECTING MICROSCOPE OBJECTIVE HAVING A DUAL MAGNIFICATION MODE AND ZOOM MAGNIFICATION CAPABILITY

[75] Inventors: David R. Shafer, Fairfield; Carmelo J. Aresco, Cromwell, both of Conn.

[73] Assignee: Spectra-Tech, Inc., Stamford, Conn.

[21] Appl. No.: 100,789

[22] Filed: Sep. 25, 1987

[51] Int. Cl.$^4$ .......................... G02B 17/06; G02B 5/10; G02B 23/06

[52] U.S. Cl. ..................................... 350/620; 350/622; 350/624; 350/505

[58] Field of Search ............... 350/620, 619, 505, 504, 350/442–445, 622, 320, 624, 518

[56] References Cited

U.S. PATENT DOCUMENTS

| | | |
|---|---|---|
| 2,485,345 | 10/1949 | Ackerman . |
| 2,520,634 | 8/1950 | Grey .................................. 350/620 |
| 2,684,015 | 7/1954 | Grey .................................. 350/620 |
| 3,064,526 | 11/1962 | Lindsay . |
| 3,453,425 | 7/1969 | Whitaker . |
| 3,527,526 | 9/1970 | Silvertooth . |
| 3,707,325 | 12/1972 | Hardeman et al. .................. 350/620 |
| 4,031,384 | 6/1977 | Sherman, Jr. . |
| 4,407,567 | 10/1983 | Michelet et al. ..................... 350/442 |
| 4,653,880 | 3/1987 | Sting et al. ........................... 350/620 |

FOREIGN PATENT DOCUMENTS 5544 1/1977 Japan .................................... 350/620

OTHER PUBLICATIONS

Shafer, "Wide-Angle Flat-Image Unobscured Telescope with Four Spherical Mirrors", paper delivered at 1983 meeting of Optical Society of America.

Primary Examiner—Jon W. Henry
Attorney, Agent, or Firm—Calfee, Halter & Griswold

[57] ABSTRACT

A modified Schwarzschild Casegrainian objective reflects radiant energy between the primary and secondary mirror two times to form a four reflection optical path. The four reflection optical path increases the magnification of the objective without making the working distance that separates the secondary mirror from the sample unacceptably small. The four reflection optical path maintains good image quality at high numerical aperture due, at least in part, to the relatively small size of a microscopic object. The objective functions as a zoom lens by changing the location of a remote field stop along the optical axis of the objective and refocusing because the emerging beam of radiant energy is nearly collimated along the optical axis at the field stop. The reflecting objective also obtains variable magnification by converting to a two reflection mode of operation by increasing the separation of the primary mirror from the secondary mirror from the sample image plane. The two reflection mode provides for less magnification than obtained with the four reflection mode.

9 Claims, 2 Drawing Sheets

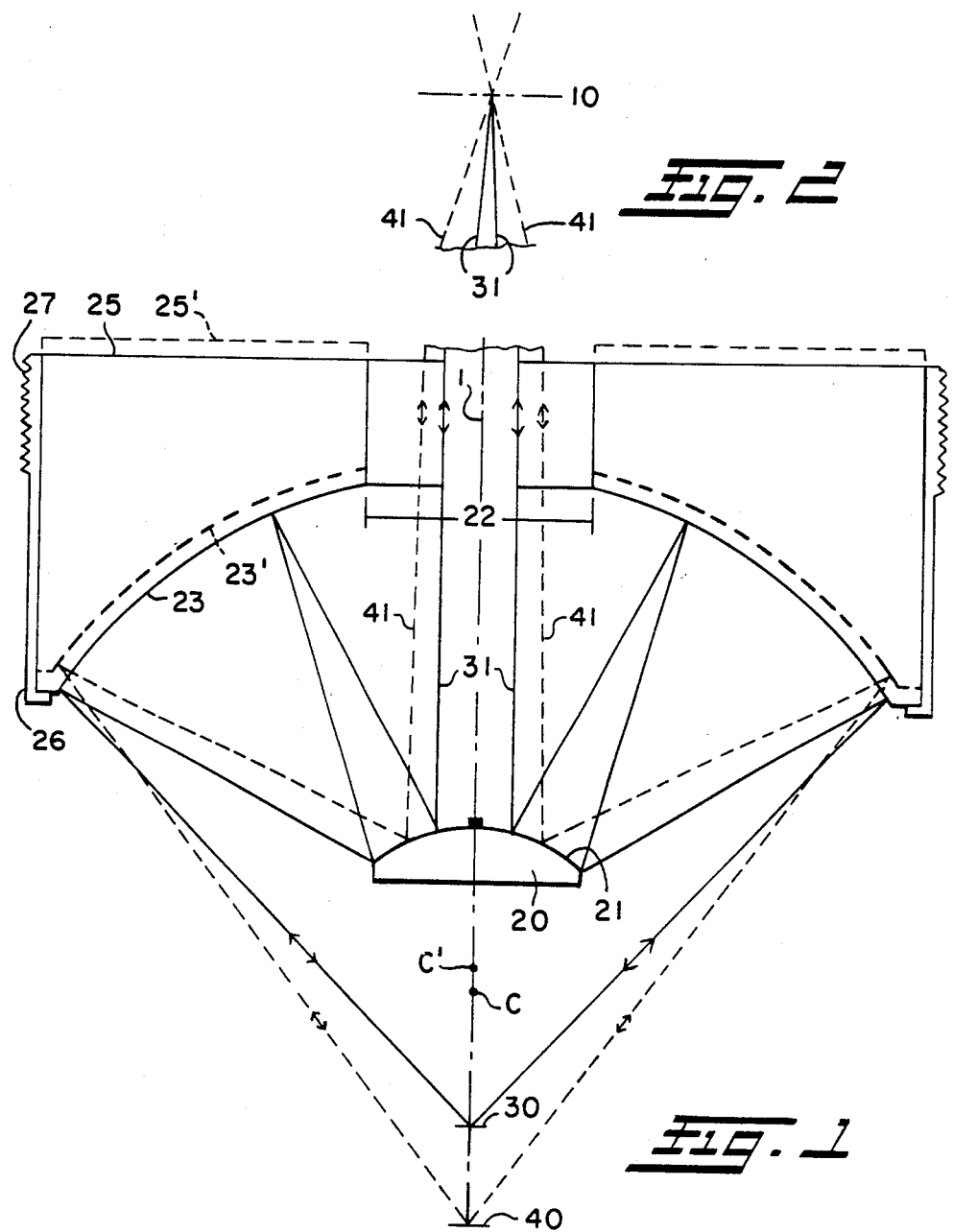

HIGH MAGNIFICATION REFLECTING MICROSCOPE OBJECTIVE HAVING A DUAL MAGNIFICATION MODE AND ZOOM MAGNIFICATION CAPABILITY

BACKGROUND OF THE INVENTION

1. Field of the Invention

The present invention relates to a microscope objective that uses only mirror optics to obtain high magnification and to a reflecting microscope objective that has variable magnification.

2. Background of the Invention

The most common reflecting microscope objective is a Schwarzschild Cassegrainian reflecting objective. This design of objective offers good image quality over a wide range of wavelengths of radiant energy. The reflectivity of mirror surfaces does not change significantly with wavelength. In contrast, a lens comprises refractive material that focuses different wavelengths of radiant energy at different foci, transmits different wavelengths of radiant energy with different efficiency and may not transmit certain wavelengths at all. The ability to image radiant energy at different wavelengths is important for contemporary microscopy because a sample is often examined with radiant energy at wavelengths ranging from the vacuum ultra violet to the far infrared.

The conventional Schwarzschild Cassegrainian microscope objective, however, is useful only at relatively low magnification because the working distance between the sample and the secondary mirror becomes too small at high magnification and high numerical aperture. High magnification requires the use of small mirrors. Decreasing the size of the mirrors, however, creates problems in manufacturing due to the extremity small size of the secondary mirror. Known designs for a reflecting microscope objective cannot easily obtain a practical magnification of 100 times.

High magnification can be obtained using remote field optics to extend the focus of a reflecting objective. Remote field optics, however, are awkward and tend to reduce image quality. No known reflecting microscope objective combines good image quality with high magnification in a practical optical configuration.

It has long been known that radiant energy can form a variety of different optical paths in a Cassegrainian mirror optical system. For example, U.S. Pat. No. 3,527,526 to Silvertooth discloses a catoptric image-forming system wherein the primary mirror twice reflects radiant energy. The secondary mirror reflects the radiant energy once or twice before forming a focus close to the secondary mirror. The various image-forming systems are telephoto lenses that form an image of an object located at or near infinity at a focal plane positioned comparatively close to the secondary mirror. The mirrors disclosed by Silvertooth are preferably aspherical and are not concentric.

A known design for a telescope objective uses concentric spherical mirrors in a four reflection Cassegrainian mirror optical system. The secondary mirror receives light from infinity. The primary mirror focuses the light relatively close to the back side of the secondary mirror. The secondary mirror in this telescope objective must be large relative to the primary mirror. The diameter obscuration of this telescope objective is approximately 0.71. The large obstruction caused by the secondary mirror makes this four reflection telescope objective impractical.

The art has also realized that a Cassegrainian microscope objective can form a four reflection optical path. The image produced by the unintentional four reflection path, however, is quite poor and totally unsuited for work at high magnification. Indeed, the four reflection path has been treated, when recognized, as a problem to be eliminated.

SUMMARY OF THE INVENTION

The present invention relates to a new optical design for the conventional Schwarzschild Cassegrainian microscope objective that uses a four reflection optical path. Both the primary and secondary mirrors have spherical curvature. The mirrors, however, are not concentric in the four reflection mode. The center of curvature of the secondary mirror is displaced toward the primary mirror. This departure from concentricity significantly reduces the size of the secondary mirror and its resulting obstruction of the aperture of the objective. The departure from concentricity does not introduce significant distortions into the image formed by the objective. The distance separating the sample image plane from the primary mirror is less than the distance separating the remote field stop from the secondary mirror. The four reflection optical path increases the magnification of the objective without making the working distance that separates the secondary mirror from the sample unacceptably small. The four reflection optical path maintains good image quality at high numerical aperture due, at least in part, to the relatively small size of the field of view in a microscope. The spherical curvature of both the primary and secondary mirrors makes the reflecting microscope objective of the present invention practical to mass produce.

The reflecting microscope objective of the present invention has several other optical properties in addition to high magnification and good image quality at high numerical aperture. It has been discovered that the four reflection optical path is nearly collimated along the optical axis at the remote field stop. The reflecting microscope objective thus functions as a zoom lens by changing the location of the remote field stop along the optical axis so as to increase or decrease the magnification of the objective. The relative distance of the sample from the primary mirror also must change to maintain proper focus.

The reflecting microscope objective of the present invention also can change its magnification by converting between two and four reflection modes. Increasing the distance separating the secondary and primary mirrors and the distance separating the secondary mirror from the sample causes the objective to image only radiant energy that is reflected along a two reflection optical path. This two reflection mode has a lower magnification than does the four reflection mode. The conversion between the two and four reflection modes need not change the location of the remote field stop if the distance separating the sample image plane from the remote field stop increases.

The reflecting microscope objective of the present invention thus functions as a high magnification reflecting microscope objective and as a dual magnification reflecting microscope objective. More generally, the present invention functions as a variable magnification reflecting microscope objective in which mirror optics actively focus radiant energy from the sample image plane at the remote field stop and actively change the magnification of the sample image plane at the remote field stop. Preferably, the mirror optics consist entirely of mirrored front surfaces so that the reflecting microscope objective exhibits no chromatic aberration.

The four reflection mode provides a greater working distance at high magnification than does a conventional two reflection Schwarzschild Cassegrainian objective operating at similar magnification. In addition, the dual magnification mode and zoom magnification capability of the present invention have distinct advantages in microscopy. For example, an infrared microscope commonly uses a variable aperture mask at a fixed field stop to spatially define an illumination area at the sample image plane from which infrared radiant energy reaches a detector. It is often difficult to correctly define the spatial extent of the illumination area at the sample image plane using only low magnification or to recognize a target area using only high magnification. Prior to the present invention, dual mode magnification could be obtained only by changing objectives. The physical bulk of a reflecting microscope objective can prevent mounting two objectives on a lens turrent. Moreover, at least one commercially available infrared microscope cannot change objectives.

The present invention eliminates the disadvantages of prior optical systems because the dual magnification mode enables the same objective to perform both low magnification targeting and a high magnification sampling at a fixed field stop. The conversion between the two and four reflection modes involves changing the separation of the primary and secondary mirrors and then refocusing the objective. The low magnification, two reflection mode can select an illumination area that can be spatially defined at high magnification in the four reflection mode. The objective can then switch back to the low magnification, two reflection mode for selecting the next illumination area so that the process can be repeated.

The zoom magnification capability enables the reflecting microscope to operate as a zoom lens. The four bounce mode offers a wide range of different magnifications by changing the location of the remote field stop along the optical axis and then refocusing by moving the sample image plane. The present invention differs from conventional zoom microscopes in being able to focus, at the same sample image plane and remote field stop, radiant energy that differs in wavelength by more than three orders of magnitude. It is unlikely that any refractive zoom microscope lens will ever obtain comparable performance over the same range of

BRIEF DESCRIPTION OF THE DRAWINGS

FIG. 1 illustrates a reflecting microscope objective according to the present invention;

FIG. 2 illustrates the focus formed at a remote field stop by the reflecting microscope objective shown in FIG. 1.

DETAILED DESCRIPTION OF THE PREFERRED EMBODIMENT

Figure 3:
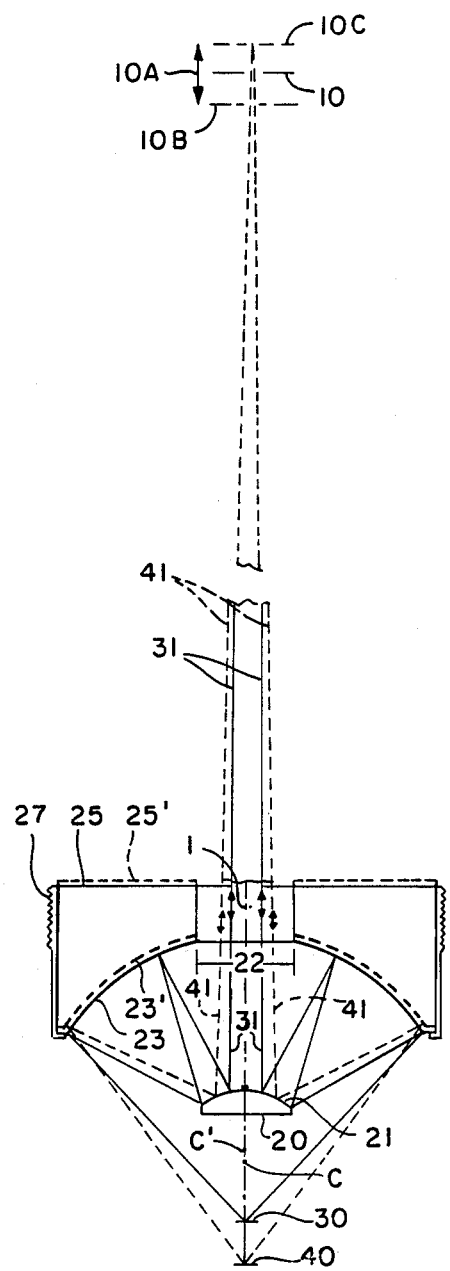
FIG. 3 is a cross-sectional elevation similar to FIG. 1 schematically showing means to vary the separation between the field stop and the lens objective.

Referring to FIG. 1, primary mirror 25 and secondary mirror 20 are aligned along optical axis 1 to form a Cassegrainian microscope objective. Primary mirror 25 has a mirrored front surface 23 and a round hole 22. A primary mirror holder 26 comprising threads 27 for engaging a threaded lens holder, not shown, can displace primary mirror 25 along the optical axis 1 to the position indicated as 25'. The displacement of the primary mirror 25 displaces mirrored front surface 23 to the location indicated as 23'.

A first sample image plane 30 corresponds to the focus of the microscope objective when operated in a four reflection mode. A beam of radiant energy 31 reflects off a mirrored front surface 21 of secondary mirror 20 to mirrored front surface 23, back to secondary mirror 20 and back to mirrored front surface 23 to form a focus at first sample image plane 30. Radiant energy beam 31 forms a remote field stop 10 shown in FIG. 2. The beam of radiant energy 31 is nearly collimated along the optical axis after leaving secondary mirror 20.

Displacing primary mirror 25 to position 25' causes radiant energy beam 41 to reflect only once from secondary mirror 20 and primary mirror 25 to form a focus at second sample image plane 40. Radiant energy beam 41 is not as nearly collimated at remote field stop 40 in this two reflection mode of operation as illustrated in exaggerated detail in FIG. 2. The reflecting microscope objective shown in FIG. 1 keeps constant the field stop distance separating secondary mirror 20 and remote field stop 10.

Many designs may be formulated using the reflecting microscope objective shown in FIG. 1 to produce a good quality image at a desired magnification. The designs differ in the size of the primary mirror and in the separation distance.

An operative embodiment of the invention is illustrated with a reflecting microscope objective having a nominal magnification of 100 in the four reflection mode and a nominal magnification of 50 in the two reflection mode:

| | | |
|---|---|---|
| Radius of curvature, primary mirror | 17.981 | mm |
| Diameter of primary mirror | 29.090 | mm |
| Diameter of hole in primary mirror | 3.589 | mm |
| Radius of curvature, secondary mirror | 5.2872 | mm |
| Diameter of secondary mirror | 6.8381 | mm |
| Field stop distance (distance between the field stop and the secondary mirror vertex) | 185.12 | mm |
| Nominal 100× | | |
| Separation distance of the primary and secondary mirrors (vertex to vertex) | 11.901 | mm |
| Working distance (distance between the sample and the secondary mirror vertex) | 9.881 | mm |
| Numerical Aperture | .71 | |
| Nominal 50× | | |
| Separation distance of primary and secondary mirrors (vertex to vertex) | 12.651 | mm |
| Working distance (distance between the sample and the secondary mirror vertex) | 11.581 | mm |
| Numerical Aperture | .71 | |

The reflecting microscope objective exemplified above can be used with any field stop distance by multiplying all numbers by an appropriate ratio of the desired field stop distance to the one given above. Working from the above illustration, one skilled in the art can form a reflecting microscope objective having different magnifications.

The design of the reflecting microscope objective shown in FIG. 1 entails several additional considerations. The back surface of secondary mirror 20 will obstruct the aperture of the reflecting microscope objective when used in the four reflection mode. Secondary mirror 20 should therefore be as thin as practical or have beveled edges on its back side to maximize the aperture of the objective.

The size of the secondary mirror 20 is preferably determined for the high magnification, four reflection mode of operation. The secondary mirror is then larger than optimal for use in the two reflection mode. This additional obstruction of the aperture does not seriously degrade the quality image obtained in the two reflection mode.

The size of hole 22 in primary mirror 25 provides a simple means for eliminating any unwanted six reflection optical path. The diameter of hole 22 should be large enough so as to not obstruct either the two or four reflection optical paths.

The reflecting microscope objective shown in FIG. 1 can function as a zoom lens when used in the four reflection mode because radiant energy beam 31 is very nearly collimated along the optical axis in the region of remote field stop 10. It is thought likely that, for the 100x objective described above, the field stop distance separating the field stop 10 from secondary mirror 20 may increase so as to obtain a magnification of 150 times or more. Likewise, decreasing the field stop distance may reduce the magnification of the reflecting microscope objective to 75 times or less.

For this purpose, means maybe provided to change the position of the field stop as indicated by arrows 10A in FIG. 3, thereby to change the field stop distance from the objective lens. As schematically shown in FIG. 3, the reduced field stop distance is shown with the field stop in phantom at 10B and the increased field stop distance is shown with the field stop in phantom at 10C.

Secondary mirror 20 and primary mirror 25 are approximately concentric about a center of curvature labelled as C in FIG. 1. The approximate concentricity reduces field aberrations to an acceptable level. The concentricity, however, is not perfect in the four reflection mode. The center of curvature C' of secondary mirror 20 lies between primary mirror 20 and its center of curvature C. The relatively small departure from concentricity improves the resolution of the objective by decreasing the size of the secondary mirror and the central obstruction it causes. The small departure from concentricity need not introduce other significant optical distortions and thus improves the optical performance of the objective. One skilled in the art can readily determine the appropriate displacement of the center of curvature for a given reflecting microscope objective.

The obscuration in the reflecting microscope objective disclosed above is greatly reduced with respect to prior four reflection mirror Schwarzchild objectives. The obscuration caused by the secondary mirror of a reflecting microscope objective may be expressed in terms of the diameter obscuration. Diameter obscuration is defined as the numerical aperture of the secondary mirror divided by the numerical aperture of the primary mirror, which is the same as the sine of the half angle of the maximum obstruction caused by the secondary mirror divided by the sine of the half angle of the maximum aperture of primary mirror. The diameter obscuration for the embodiment of the present invention given above in the table is 0.518 in the four reflection mode.

The reflecting microscope objective shown in FIG. 1 produces a high quality image in either a transmittance or dark field reflectance mode where the objective only images the sample. The image quality is also good in a bright field reflectance mode where the objective both focuses radiant energy at the sample image plane and images the specularly reflected radiant energy at the remote field stop. The image formed in the two reflection mode is fully comparable to the image formed by a conventional Schwarzschild Cassegrainian microscope objective except for a minimal loss in resolution resulting from the additional obstruction of the aperture caused by the oversized secondary mirror. The image formed in the four reflection mode is twice as curved as the image in the two reflection system. The field curvature, and any other optical distortions, are sufficiently minimal that the resulting image is fully acceptable for conventional microscopy, particularly microspectrophotometry, due in part to the small field of view of a microscope.

In addition to its use as a high magnification reflecting microscope objective, the present invention provides a means for varying the magnification used to observe a sample that uses mirror optics as the active optical elements. The term active optical elements refers to the optical elements that focus the radiant energy, in contrast to other optical elements such as correction plates and filters that merely alter the image formed by the active elements or transfer optics that merely move light from one location to another. Mirror optics have the advantage of being free of chromatic aberrations over the working range of the reflecting surfaces. Mirrored front surfaces are particularly insensitive to chromatic effects. The present invention thus provides a microscope objective that can vary the magnification of a sample using radiant energy having wavelengths anywhere from the vacuum ultra violet to the far infrared.

The principles, preferred embodment and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention set forth in the appended claims.

What is claimed is:

1. A reflecting microscope objective selectively having a two reflection or a four reflection magnification mode, comprising:

a remote field stop positioned along an optical axis;

a primary mirror having a concave spherical curvature and being positioned along the optical axis, said primary mirror having an on-axis hole therethrough and a center of curvature;

a secondary mirror having a convex spherical curvature with a center of curvature and being positioned along the optical axis in spaced relationship from the primary mirror to provide a separation therebetween, means to change the separation distance between the primary mirror and the secondary mirror from a first separation distance for the four reflection mode to a second separation distance for the two reflection mode or vice versa;

a first sample image plane positioned along the optical axis and being separated by a finite first working distance from the secondary mirror;

a second alternate sample image plane positioned along the optical axis and being separated by a finite second working distance from the secondary mirror;

the four reflection mode occurring when the primary mirror and secondary mirror are spaced apart the first separation distance, said first sample image plane being closer to said primary mirror than said remote field stop is to said secondary mirror, said secondary mirror having its center of curvature displaced slightly toward said primary mirror with respect to said center of curvature of said primary mirror, whereby said first separation distance and said first working distance are such as to form a four reflection optical path extending from said first sample image plane to said primary mirror, from said primary mirror to said secondary mirror, from said secondary mirror to said primary mirror, from said primary mirror to said secondary mirror and from said secondary mirror through said on-axis hole to said remote field stop; and the two reflection mode occurring when the space between said primary mirror and said secondary mirror has been changed by said means to change to the second separation distance, whereby said second working distance and said second separation distance are such as to form a two reflection optical path extending from the second sample image plane to the primary mirror, from the primary mirror to the secondary mirror and from the secondary mirror through said on-axis hole to said remote field stop.

2. The reflective microscope objective of claim 1 further including means to vary the spacing between the field stop and primary mirror to vary magnification ratio of the objective, with the optical path being substantially columnar at the remote field stop.

3. A reflecting microscope objective as claimed in claim 1, wherein:
said second working distance is greater than said first working distance; and
said second separation distance is greater than said first separation distance.

4. A reflecting microscope objective as claimed in claim 3, wherein said field stop distance is constant.

5. A reflecting microscope objective as claimed in claim 1, wherein:
said secondary mirror has a size that is optimal for said four reflection optical path; and
said secondary mirror is thin or has beveled edges so as to block as little as practical of said optical path between said primary mirror and said first sample image plane.

6. A reflecting microscope objective as claimed in claim 1, wherein said hole in said primary mirror has a size determined so as to eliminate a six reflection optical path between said first sample image plane and said first remote field stop without obstructing said two reflection optical path.

7. A reflecting microscope objective comprising:
a radiant energy beam passing along an optical axis;
an objective lens having a primary mirror and a secondary mirror in spaced relationship to one another along the optical axis;
a remote field stop positioned along the optical axis on one side of and in spaced relationship from the lens;
at least one sample image plane positioned along the optical axis on the other side of and in spaced relationship from the lens;
first means to vary the space between the primary and secondary mirrors to vary the respective number of radiant energy beam reflections off the primary mirror and secondary mirror, selectively to change magnification ratio; and
second means to vary the space between the field stop and the lens further to vary the magnification ratio selected.

8. The reflective microscope objective of claim 7 wherein the primary mirror has an on-axis hole to allow radiant energy to pass therethrough and the space between the primary mirror and secondary mirror is variably set by the first means to vary to obtain either two reflections or four reflections.

9. A method of forming images in a reflecting microscope objective, comprising the steps of:
directing an optical path from a focus at a second sample image plane to a primary mirror;
directing said optical path from said primary mirror to a secondary mirror positioned at a second separation distance from said primary mirror;
directing said optical path from said secondary mirror to a remote field stop positioned at a field stop distance from said secondary mirror;
decreasing said separation distance to a first separation distance;
decreasing a working distance between said secondary mirror and said focus to a first working distance;
directing said optical path from a first sample image plane at said focus to said primary mirror;
directing said optical path from said primary mirror to said secondary mirror;
directing said optical path from said secondary mirror again to said primary mirror;
directing said optical path from said primary mirror again to said secondary mirror; and
directing said optical path from said secondary mirror to said remote field stop;
said first and second working distances being less than infinity.

* * * * *